United States Patent [19]
Low

[11] 3,734,432
[45] May 22, 1973

[54] SUPPRESSION OF FLUTTER
[76] Inventor: George M. Low, c/o National Aeronautics and Space Administration, Washington, D.C. 20546
[22] Filed: Mar. 25, 1971
[21] Appl. No.: 127,915

[52] U.S. Cl. ............. 244/77 G, 244/75 A, 244/76 C, 244/77 F
[51] Int. Cl. ............................................. B64c 13/18
[58] Field of Search ............... 244/75 A, 76 C, 77 R, 244/77 A, 77 D, 77 F, 77 G

[56] References Cited
UNITED STATES PATENTS
| | | | |
|---|---|---|---|
| 3,215,374 | 11/1965 | Olshausen | 244/77 G |
| 3,279,725 | 10/1966 | Andrew et al. | 244/77 G |
| 2,962,243 | 11/1960 | Coleman et al. | 244/76 C |
| 2,996,267 | 8/1961 | Warren | 244/75 A |
| 3,409,251 | 11/1968 | Lawson et al. | 244/77 F |

FOREIGN PATENTS OR APPLICATIONS
931,661  7/1963  Great Britain ..................... 244/77 G Primary Examiner—Milton Buchler
Assistant Examiner—Stephen G. Kunin
Attorney—John R. Manning, Howard J. Osborn and William H. King

[57] ABSTRACT

An active aerodynamic control system to control flutter over a large range of oscillatory frequencies unaffected by mass, stiffness, elastic axis, or center-of-gravity location of the system, mode of vibration or subsonic Mach number consisting of one or more pairs of leading edge and trailing edge hinged or deformable control surfaces, each pair operated in concert by a stability augmentation system. Torsion and bending motions or deflections of the fluttering member are sensed and converted by the stability augmentation system into leading and trailing edge control surface deflections which produce lift forces and pitching moments to suppress flutter.

5 Claims, 11 Drawing Figures

INVENTOR.
ELIAHU NISSIM
BY Howard J. Osborn
William H. King
ATTORNEYS

Patented May 22, 1973

INVENTOR.
ELIAHU NISSIM
BY Howard J. Osborn
William H. King
ATTORNEYS

Patented May 22, 1973

INVENTOR.
ELIAHU NISSIM

BY Howard J. Osborn
William H. King
ATTORNEYS

Patented May 22, 1973

INVENTOR.
ELIAHU NISSIM
BY
ATTORNEYS

SUPPRESSION OF FLUTTER

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This invention relates to an aerodynamic control system to control flutter or other oscillatory motion and more particularly to a control system including pairs of leading and trailing edge control surfaces, each pair operated in concert by a stability augmentation system to damp out torsion and bending of the oscillating member. For the typical large commercial aircraft and particularly for an aircraft such as a supersonic transport, the weight penalty incurred when structural stiffness is increased to avoid flutter problems makes such a choice highly costly if not prohibitive. An aerodynamic control system which actively combats flutter becomes the more attractive alternative from both weight reduction and fatigue life standpoints. Such a system will be called on, however, to suppress flutter, alleviate gust response and control vehicle instability despite the influence of such variables as oscillatory frequency, mode of vibration, subsonic Mach number, mass, stiffness, elastic axis location, or center-of-gravity location of the system.

Flutter typically consists of both torsional (or twisting) and bending (or plunging up and down) motions. Active control of, for example, wing flutter has heretofore involved the use of a trailing edge, hinged control surface. The inability of a single trailing edge (or a single leading edge) control to simultaneously damp certain combinations of torsional and bending motions of the fluttering member has led to the development of the cooperating leading and trailing edge control system. If, as will be subquently explained, the deflection of the single trailing edge control is initiated to counteract bending, the deflection may actually reinforce torsional motion. With the leading edge, trailing edge cooperating pairs of control surfaces, deflection of one control surface may be used to counteract bending while simultaneously deflection of the other control surface may be used to oppose torsional motion. Thus the cooperating leading edge and trailing edge control surfaces enable both the torsional and bending motions associated with flutter to be opposed simultaneously.

SUMMARY OF THE INVENTION

The active aerodynamic control system includes at least one pair of control surfaces located on the leading edge and trailing edge of the fluttering member. At least two sensors located on the fluttering member adjacent to the control surfaces are used to obtain the effects of flutter upon the member in terms of torsional or bending deflections or the time derivatives of these deflections. Information thus sensed is transmitted to a stability augmentation system as electrical input signals. These input signals are converted into control deflections of the leading edge and trailing edge control surfaces. A feedback loop insures the attainment of the computed deflections. The conversion factors which enable input signals to be transformed into control deflection signals are obtained by a theoretical optimization process to be subsequently discussed. Certain of these conversion factors primarily affect control response to flutter while certain other conversion factors predominate in gust alleviation or vehicle stability augmentation.

An aircraft which is dynamically represented by n modes of vibration may require, at most, $n/2$ pairs of leading and trailing edge controls. Control of the conversion factor relating main surface angles of attack caused by flutter to leading edge control surface deflection angles prevents unfavorable flutter interaction between rigid sections of the fluttering member and sections of the flutter member bearing the hinged leading edge and trailing edge control surfaces.

Flutter of a wing having a deformable chord section may be controlled by careful placement of the flutter sensors. Placement of rotational sensors upon the control surfaces themselves to measure control deflection due to chordwise deformation provides a reference for the control loop of the stability augmentation system. Deflection signals from the stability augmentation system are compared with the deflection of the control surfaces caused by chordwise deformation to determine the necessary correctional deflection.

Stabilization of rigid body modes of the vehicle may be controlled by careful positioning of the pairs of control surfaces in relation to the vehicle center of gravity and by using such paired controls on tail as well as wing members. A brief analysis of control power requirements has revealed that the power necessary to run such a control surface system is within the capabilities of modern-day systems.

BRIEF DESCRIPTION OF THE DRAWINGS

A more complete appreciation of the invention and many of the attendant advantages thereof will be readily apparent as the same becomes better understood by reference to the following detailed description when considered in connection with the accompanying drawings wherein.

DESCRIPTION OF THE PREFERRED EMBODIMENT

Referring now more particularly to the drawings wherein like numerals identify like parts throughout the several views, and more particularly to FIG. 1 there is shown a symmetrical air-foil section 10 having a trailing edge control 11 and a leading edge control 12. Controls 11 and 12 are hinged to move up or down and have an equal chord-wise dimension. A symmetrical section and controls of equal chord length are chosen only for purposes of illustration and the invention is not so limited.

Figure 2:
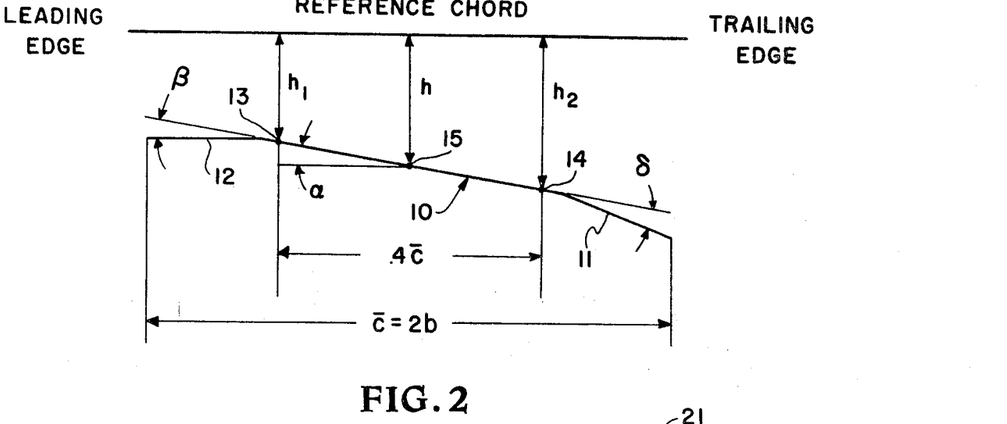
FIG. 2 is a schematic of a wing section having leading and trailing edge control surfaces and which has been displaced in certain distance and angle from a reference chord.

FIG. 2 shows an airfoil section 10 in schematic. Airfoil 10 is fluttering wherein it is displaced a distance $h$ from a reference chord and rotated relative to the reference chord at an angle $\alpha$. The fluttering motions can be detected by two sensors 13 and 14 which are located on or in airfoil section 10 at a known distance ( in terms of percent chord) from the leading edge. Forward sensor 13 and rearward sensor 14 sense either displacement from the reference chord $h_1$ and $h_2$ or a time derivative (velocity or acceleration) of such displacement. Moreover, as an alternative scheme, a rotational and a linear motion sensor may be co-located at 15 to measure the rotation of section 10 about its mean aerodynamic center and the displacement of the section 10 from the reference chord.

Chord length of airfoil 10 is defined by $\bar{c}$ or $2b$. The deflection angle of the leading edge control 12 relative to the controls neutral chord line is $\beta$ while deflection of the trailing edge control 11 gives the angle $\delta$.

Figure 3A:
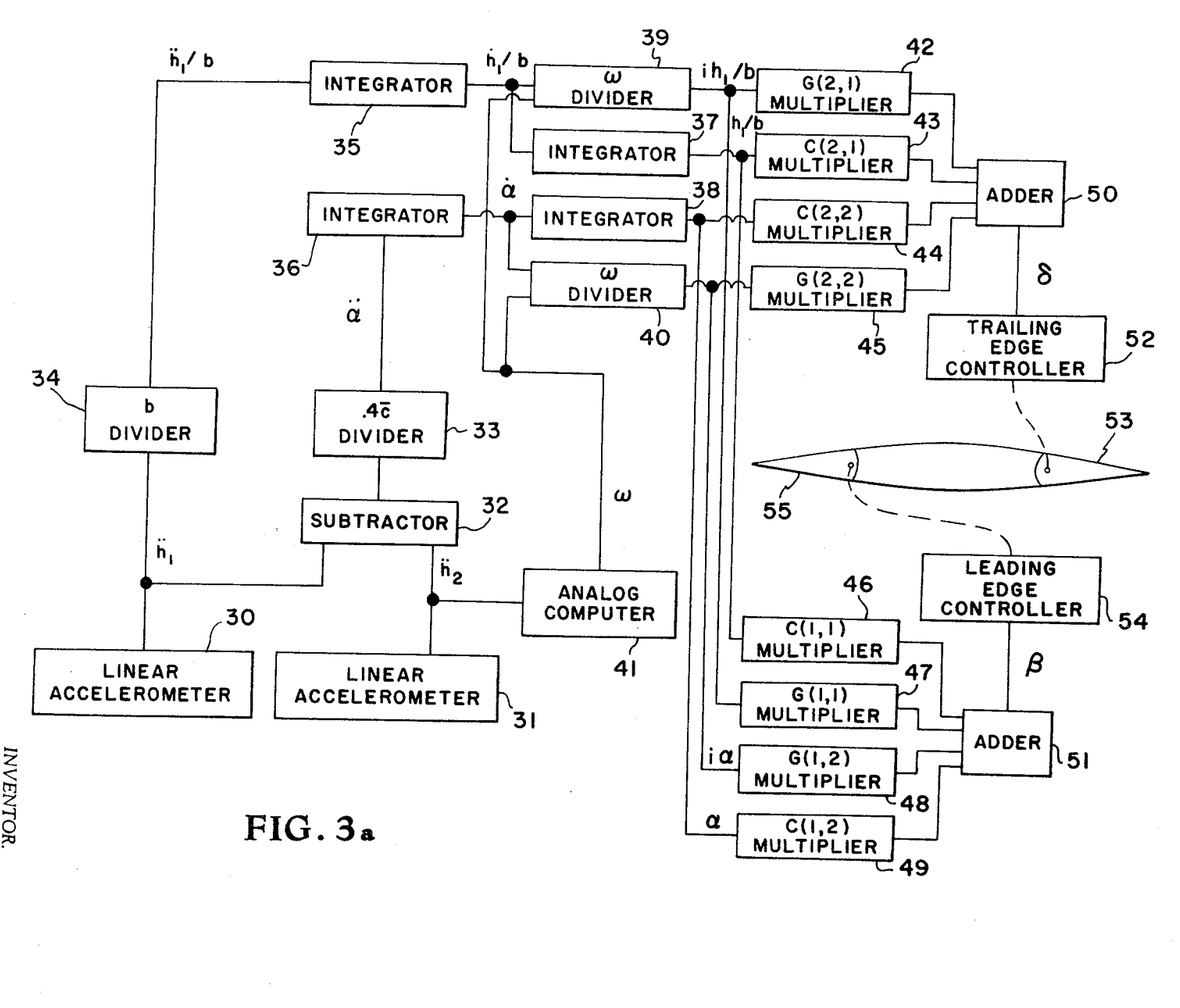
FIG. 3a is a schematic of the functions of a stability augmentation system which converts flutter motion and frequency signals obtained from two linear accelerometers on the fluttering wing into signals which deflect the leading and trailing edge control surface to actively combat flutter.

FIG. 3a shows a schematic example of a stability augmentation system utilizing signals from two linear accelerometers corresponding to sensors 13 and 14 in FIG. 2 which are $.4\bar{c}$ apart. Calculating or knowing the frequency of oscillation $\omega$, the distance $b$ (from FIG. 2) and the transfer functions $G(2,1)$, $C(2,1)$, $C(2,2)$, $G(2,2)$, $C(1,1)$, $G(1,2)$, $G(1,1)$, and $C(1,2)$, the stability augmentation system can calculate the control deflections $\beta$ and $\delta$. The functions denoted G are out-of-phase (i.e., in quadrature with respect to the displacements) whereas all other are inphase which will be discussed in detail later.

The embodiment of the invention disclosed in FIG. 3a includes two linear accelerometers 30 and 31 which correspond to sensors 13 and 14, respectively. The output of accelerometer 30 is a signal proportional to $\ddot{h}_1$ (the second derivative with respect to time of $h_1$ shown in FIG. 2) and the output of accelerometer 31 is $\ddot{h}_2$ (the second derivative with respect to time of $h_2$). The signals $\ddot{h}_1$ and $\ddot{h}_2$ are applied to a subtractor 32 which produces a signal proportional to $\ddot{h}_2-\ddot{h}_1$. This signal is divided by a constant term $.4\bar{c}$ with a divider 33 to produce the signal $\ddot{\alpha}$. The signal $\ddot{h}_1$ is divided by the constant term $b$ with a divider 33 to produce the signal $\ddot{h}_1/b$. The signals $\ddot{h}_1/b$ and $\ddot{\alpha}$ are integrated by integrators 35 and 36, respectively, to produce the signals $\dot{h}_1/b$ and $\dot{\alpha}$. These two signals are integrated by integrators 37 and 38, respectively, to produce the signals $h_1/b$ and $\alpha$. The signals $\dot{h}_1/b$ and $\dot{\alpha}$ are also divided by $\omega$ with divider 39 and 40, respectively, to produce the signals $ih_1/b$ and $i\alpha$.

The signal $\omega$ is produced by an analog computer from the output of one of the linear accelerometers 30 and 31, or a different accelerometer at another location could be used to supply the input to computer 41. Different methods are available that can be mechanized by computer 41 to compute $\omega$. One such method is based on the simple harmonic motion relationship $\omega^2 = |\text{acceleration}|/|\text{displacement}|$. Another method measures "period" by detecting zero-crossings. Also $\omega$ can be made to be constant with some loss of effectiveness of the system.

The signal $ih_1/b$ is applied to multipliers 42 and 47; the signal $h_1/b$ is applied to multipliers 43 and 46; the signal $i\alpha$ is applied to multipliers 45 and 48; and the signal $\alpha$ is applied to multipliers 44 and 49. The outputs of multipliers 42–45 are summed by an adder 50 to produce the signal $\delta$ and the outputs of multipliers 46–49 are summed by an adder 51 to produce the signal $\beta$. The signal $\delta$ is applied to a trailing edge controller 52 which controls the movement of a trailing edge control element 53, and the signal $\beta$ is applied to a leading edge controller 54 which controls the movement of a leading edge control element 55. Controller 52 and controller 54 can be any device, such as a servo motor, that will convert an electrical signal into a mechanical motion. A sensor on each control surface senses the deflections of the control surfaces $\beta_{out}$ and $\delta_{out}$. The error functions $(\beta_{OUT}-\beta)$ and $(\delta_{OUT}-\delta)$ are then formed through the normal feedback design. These control surface sensors and the feedback loops are well known and are not shown in FIGS. 3a and 3b. Similarly, the other elements shown in FIG. 3a are well known and hence are not disclosed in detail in this specification.

Figure 3B:
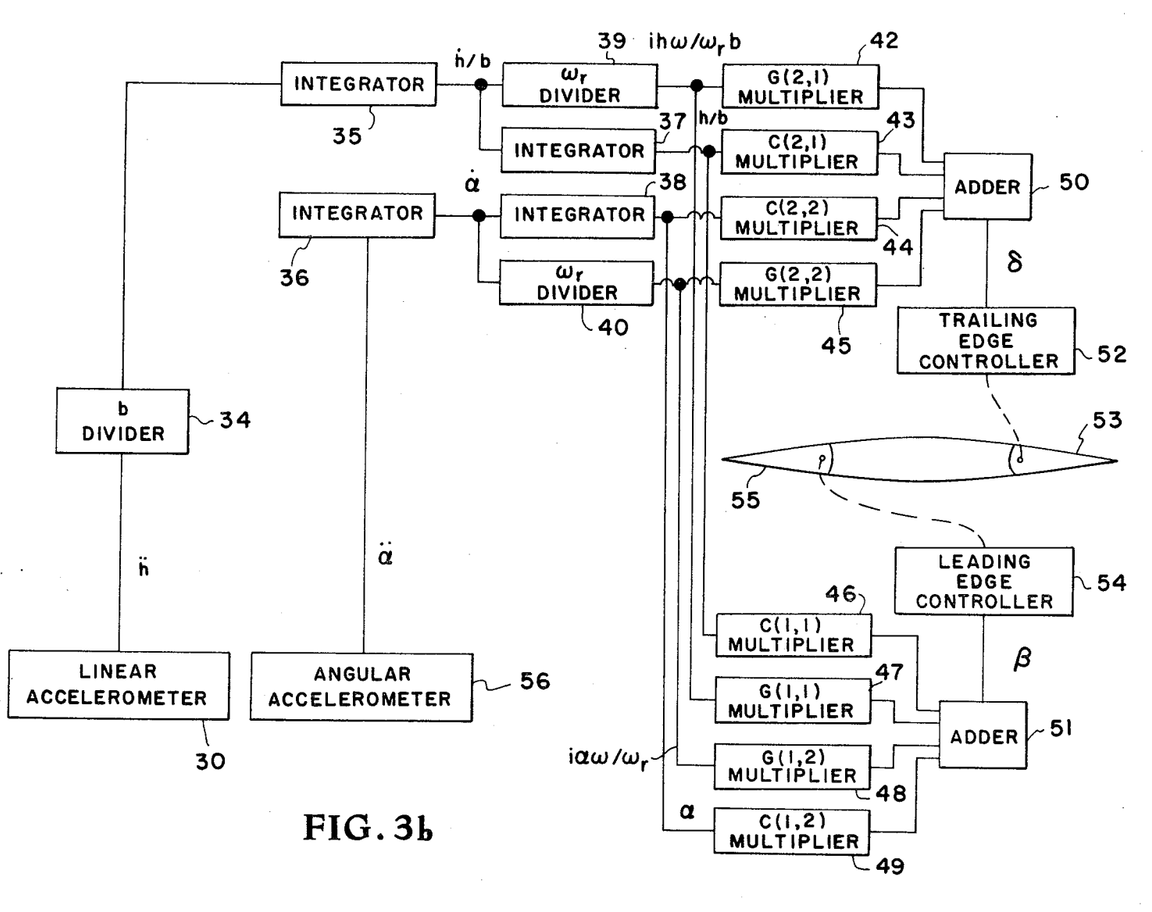
FIG. 3b is a schematic of a stability augmentation system which converts flutter motion signals from rotational and linear accelerometers into signals for counteracting control deflections based on a constant reference frequency $\omega_r$.

FIG. 3b differs from FIG. 3a in the use of a constant reference frequency $\omega_r$ rather than an actual (measured) frequency $\omega$ and in the flutter sensor inputs. Here two flutter sensors are colocated on the wing section (see location 15 in FIG. 2) to sense rotational acceleration $\ddot{\alpha}$ and linear acceleration $\ddot{h}$. The structure in FIG. 3b differs from that in FIG. 3a in that an angular accelerometer 56 is used in place of linear accelerometer 31 and subtractor 32, divider 33 and analog computer 41 are not used. That is, the output of accelerometer 56 is applied directly to integrator 36, and $\omega_r$ is a constant.

Figure 4:
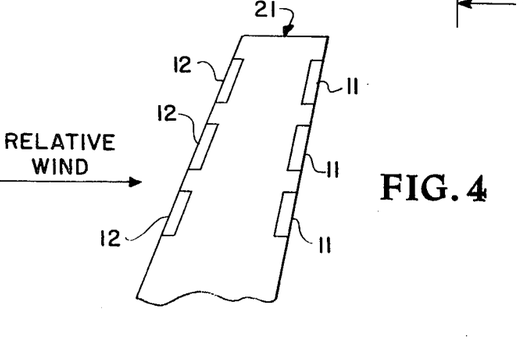
FIG. 4 is a planform view of a wing having several pairs of leading and trailing edge control surfaces along the span.

FIG. 4 shows a wing 20 having a wing tip 21 and several pairs of leading and trailing adge control surfaces 12 and 11. For convenience the pairs of controls may be referred to as outboard, inboard, midspan in like manner as aircraft engines placed along a wing.

Figure 5:
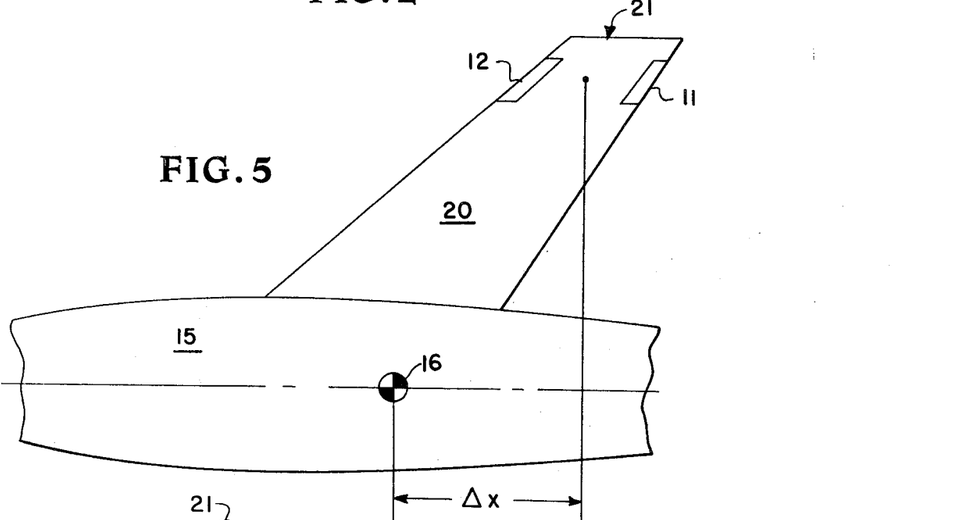
FIG. 5 is a planform view of a swept-wing vehicle having a pair of leading/trailing edge control surfaces mounted outboard near the wing tip and well aft of the vehicle center of gravity.

FIG. 5 shows a vehicle 15 having a swept wing 20 and a pair of leading edge 12 and trailing edge 11 controls placed well aft of the vehicle center of gravity 16 because of their outboard location.

Figure 6A:
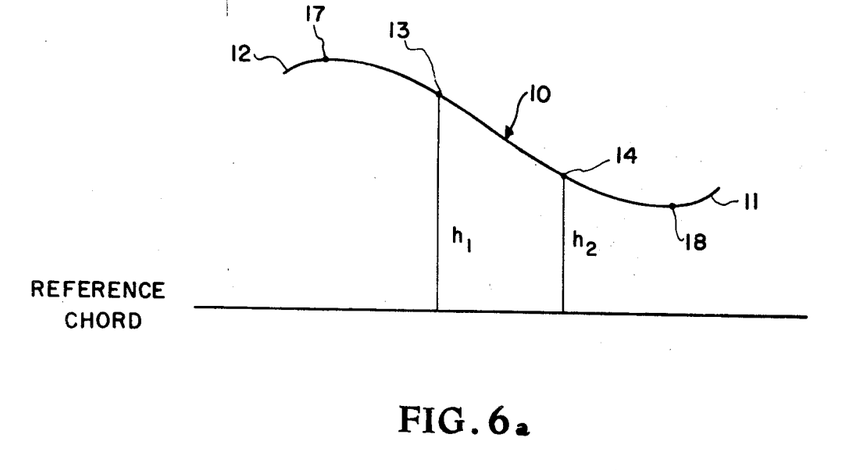
FIG. 6a is a schematic of a deformable chord wing section displaced from a reference chord.

A deformable-chord wing section 10 is shown in FIG. 6a. The center section of the chord of wing section 10 between flutter sensors 13 and 14 (see also FIG. 2) is practically rigid. The more flexible leading edge and trailing edge sections of the chord wherein controls 12 and 11 are located are also equipped with position sensors 17 and 18 to measure the approximated chordwise deformation of the leading and trailing edge chord sections. Sensors 17 and 18 may be rotational accelerometers placed on the leading edge and trailing edge controls near the control hinge line.

Figure 6B:
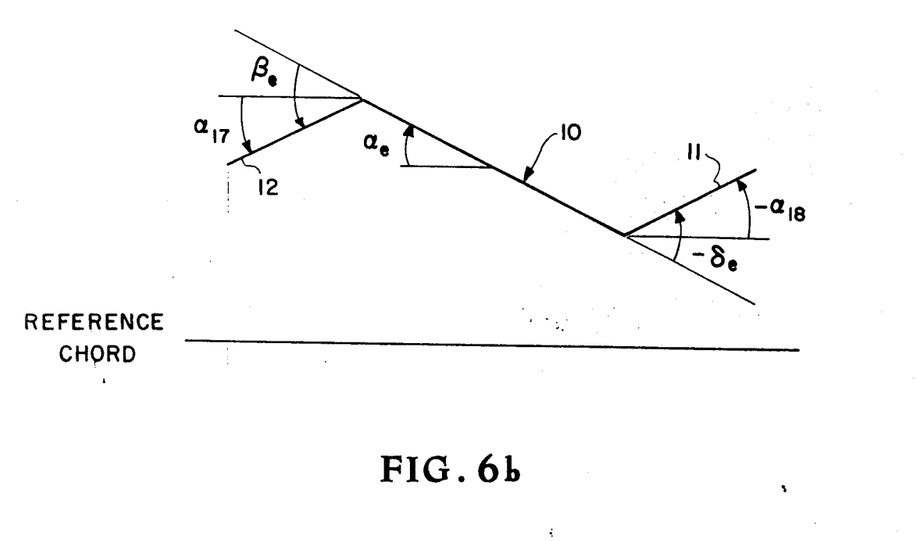
FIG. 6b is a simplified schematic of a deformable chord wing section displaced from a reference chord and having leading and trailing edge control surfaces.

The deformation of the deformable chord wing section 10 may be approximated by wing section 10 shown in FIG. 6b. $\alpha_e$ represents the equivalent angle of attack of the deformed-chord wing section 10 while $\beta_e$ and $\delta_e$ represent the equivalent leading and trailing edge control deflections for the deformed-chord section 10. "17 and "18 represent the angular movement of the leading and trailing edge portions of the chord measured by sensors 17 and 18.

OPERATION

Figure 1A:
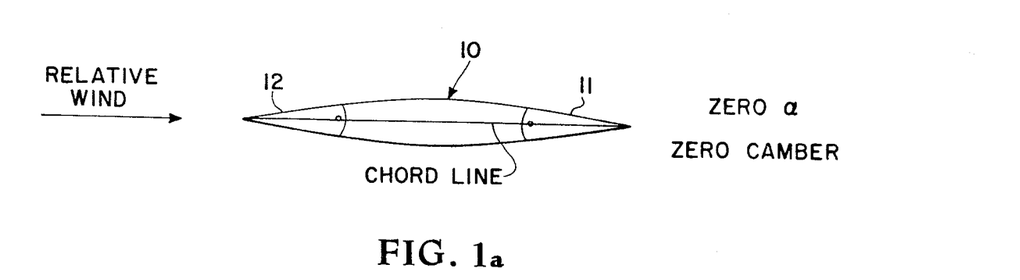
FIG. 1a is a symmetrical wing section (zero camber) at zero angle of attack and having leading and trailing edge flapped control surfaces.
Figure 1B:
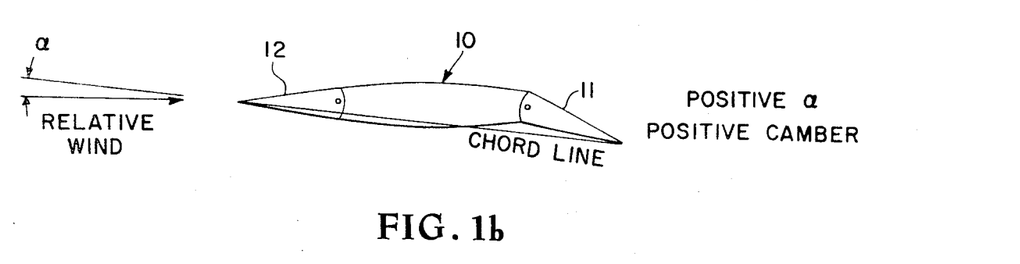
FIG. 1b is the same wing section with the trailing edge control deflected downward giving positive camber and positive effective angle of attack.
Figure 1C:
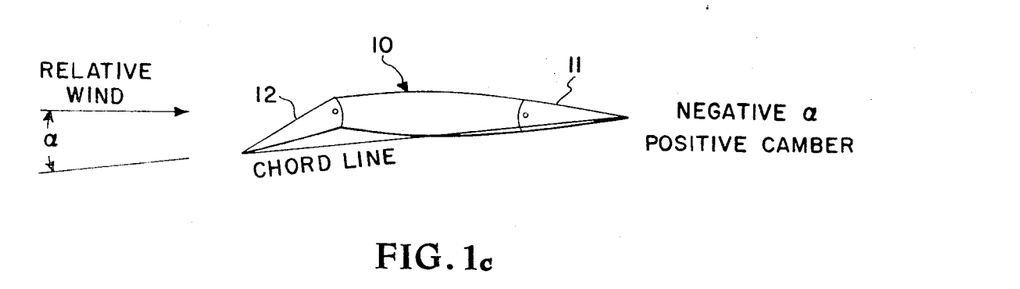
FIG. 1c is the same wing section with the leading edge control deflected downward giving positive camber and negative effective angle of attack.

The operation of the present invention is now believed to be apparent. FIG. 1 shows the effects of the (downward) deflection of leading and trailing edge hinged control surfaces. Using, for example, a symmetrical airfoil with its chord line alined with the relative wing in FIG. 1a gives zero angle of attack and zero camber when controls are undeflected. Downward deflection of a trailing edge control as in FIG. 1b causes chord line rotation to a positive effective angle of attack as well as changing wing section curvature to give positive camber. These two effects are additive. Downward deflection of a leading edge control as in FIG. 1c causes chord line rotation to a negative effective angle of attack although camber is changed positively. Therefore the camber change caused by the deflection of the leading edge control (up or down) is partially offset by chord line rotation giving unfavorable or negative angle of attack change. At this point, we note the inherent advantage of the trailing edge control to change section lift as against the effect of the leading edge control.

Figure 1D:
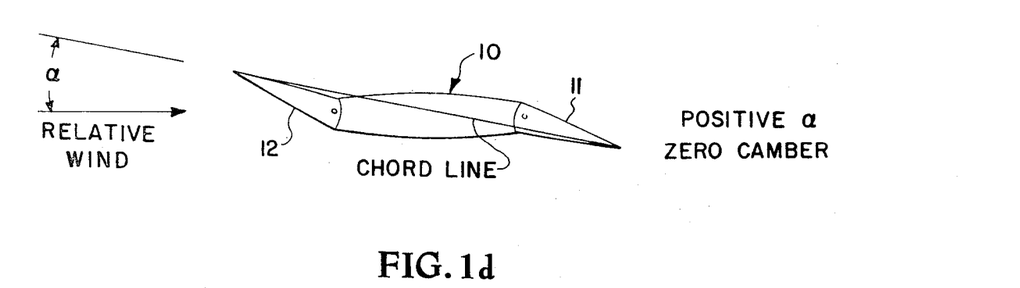
FIG. 1d is the same wing section with the controls deflected in opposite directions so that the effective camber is zero and the effective angle of attack is positive.

Operating the leading and trailing edge controls in opposite directions as shown in FIG. 1d can give, in essence, a symmetrical section at a positive angle of attack which will produce increased lift despite the fact that camber-wise the two controls appear to be working at cross purposes. Putting angle of attack effects to one side, the control deflections shown in FIG. 1b and FIG. 1c produce higher lift through an increase in camber. From basic aerodynamics a positively cambered airfoil typically produces a negative (nose down) pitching moment about the aerodynamic center (a.c.) whereas pitching moment about the a.c. of a symmetrical section is zero. Thus, the configuration in FIG. 1b and FIG. 1c will produce positive lift accompanied by (negative) nose-down pitching moment about the a.c. whereas the configuration in FIG. 1d can produce positive lift and zero moment about the a.c. Moreover, leading edge deflection as in FIG. 1c will produce large moment change in comparison to lift change.

Here is the advantage with respect to flutter control of operating leading and trailing edge controls in concert. Flutter analyzed at a section along the wing span involves a bending, wherein the wing section oscillates up and down in translation, and a twisting, wherein the wing section oscillates noseup and nose down in rotation. To combat the flutter at this wing section, lift must be produced to counter the bending and moment must be produced to counter the twisting. With the trailing edge or leading edge control alone, the control deflection required to produce the needed lift may or may not also produce the needed moment about the a.c. Using the two controls in concert permits variation of camber and angle of attack to produce the proper balance of lift and section pitching moment to simultaneously combat both twisting and bending. Although the controls work in concert, the trailing edge control (as discussed before) is the more effective in influencing lift while the primary (but not the only) use of the leading edge control is in controlling the moment about the a.c.

To control flutter, the twisting and bending motions must be measured along a section of the wing containing the leading and trailing edge control surfaces. The frequency of oscillation must also be measured if the scheme described in FIG. 3a is used, whereas the scheme in FIG. 3b uses a constant reference frequency. At least two sensors are required to measure the two flutter motions. As shown in FIG. 2, two accelerometers 13 and 14 are mounted on the wing adjacent but not on the control surfaces. FIG. 2 shows the desired data $h_1$ and $h_2$ which represent the displacement of the sensors 13 and 14 from a reference chord. Sensors 13 and 14 are spaced .4 chord apart for the purpose of illustration of the flutter control technique and to satisfy the trigonometry of FIG. 3a which shows the block diagram illustrating the operation of a stability augmentation system computer. The accelerometers 13 and 14 transmit linear acceleration signals $\ddot{h}_1$ and $\ddot{h}_2$ which give $\ddot{\alpha}$ by simple trigonometry. Double integration yields $h_1$ and $\alpha$. Frequency $\omega$ is obtained by actual measurement in the FIG. 3a method.

In FIG. 3b an alternate sensor scheme is shown whereby a rotational accelerometer supplies $\ddot{\alpha}$ and a linear accelerometer supplies $\ddot{h}$ to the stability augmentation system. The two sensors may be co-located as shown in FIG. 2, location 15. $\alpha$ and $h$ are then found directly by integrations. Also in FIG. 3b, a constant reference frequency is used in lieu of measurement of the actual frequency. It can be shown that this constant frequency approximation will not greatly affect flutter suppression with a leading/trailing edge control system.

The last blocks on the right of FIG. 3a and FIG. 3b are transfer functions which are found through an optimization process. the '$i$' terms just to the left of the transfer function blocks represent 90° of phase lead terms which are intended to produce damping. The other (non "$i$") terms are real response terms to oppose the bending or twisting deflection which is sensed.

The governing equations for the computation of control deflection angles $\beta$ and $\delta$ (see FIG. 2) as shown in the block diagram in FIGS. 3a and 3b are:

$$\beta = [C(1,1) + iG(1,1)] \, h/b + [C(1,2) + iG(1,2)] \, \alpha \quad 1$$
$$\delta = [C(2,1) + iG(2,1)] \, h/b + [C(2,2) + iG(2,2)] \, \alpha \quad 2.$$

The $C$ and $G$ terms in equations (1) and (2) are transfer functions transferring $h$ and $\alpha$ which are measured by sensors 13 and 14 (or 15) and portions of the computer as shown in FIG. 3a and FIG. 3b which convert electrical signals into $\beta$ and $\delta$ values. These $C$ and $G$ transfer functions may be thought of as gearing ratios between the motions of the main surface ($h$ and $\alpha$) and the deflections of the control surfaces ($\beta$ and $\delta$). These transfer functions may be written in matrix form for optimization by electronic computer as:

$$\begin{Bmatrix} \beta \\ \delta \end{Bmatrix} = \begin{bmatrix} C_{11} & C_{12} \\ C_{21} & C_{22} \end{bmatrix} \begin{Bmatrix} h/b \\ \alpha \end{Bmatrix} + i \begin{bmatrix} G_{11} & G_{12} \\ G_{21} & G_{22} \end{bmatrix} \begin{Bmatrix} h/b \\ \alpha \end{Bmatrix} \quad (3)$$

One such optimization resulted in the following values of the transfer functions:

$$\begin{bmatrix} C_{11} & C_{12} \\ C_{21} & C_{22} \end{bmatrix} = \begin{bmatrix} 0.5 & 1.0 \\ -0.05 & -1.7 \end{bmatrix} \quad (4)$$

$$\begin{bmatrix} G_{11} & G_{12} \\ G_{21} & G_{22} \end{bmatrix} = \begin{bmatrix} -0.5 & 1.0 \\ 0.45 & 0.2 \end{bmatrix} \quad (5)$$

In the diagram of FIGS. 3a and 3b, those terms in equations (1) and (2) which do not influence flutter appreciably are $G(1,1)$, $C(1,1)$ and $C(2,1)$. Transfer function $C(2,1)$ does have predominant importance in controlling rigid body modes. This is an important feature of the stability augmentation system. Since the transfer functions affecting flutter are relatively independent of the $C(2,1)$ term which primarily affects rigid body modes, control of elastic and rigid body modes can be achieved by the same system. Since gust response problems are analogous, the leading/trailing edge control system can provide very efficient gust alleviation. Thus a novel feature of the invention is to combine control of elastic and rigid body modes and gust response in one package. The "$i$" terms are, once again, 90° phase lead terms which anticipate the motion of the wing vehicle in an attempt to damp flutter, control instability or alleviate gust response. The other (non "$i$") terms produce control deflections in direct response to the sensed wing or vehicle motions.

Optimization of each of the transfer functions was accomplished by calculating and plotting eigenvalues for the aerodynamic energy matrix against the inverse of the nondimensional reduced frequency ( Velocity/$\omega b$) for a series of values of each transfer function taken separately. The optimum value of the transfer function was defined as that value which produced the best performance of the minimum eigenvalue across a range of ( Velocity/$\omega b$) . Sensitivity of curves of minimum eigenvalue against the inverse of reduced frequency ( Velocity/$\omega b$ ) for off-design values of the transfer functions are necessary to determine just how much accuracy is required. $C(2,2)$ and $G(2,2)$ were found to be the most sensitive parameters. Rough assessment of the power required to drive the controls revealed little or no problem in this area if one starts computing with low values of the transfer functions to insure small control deflections and especially if $G(1,1)$, $C(1,1)$ and $C(2,1)$ are ignored as insignificant in the flutter application. Investigations of compressibility effects have shown those effects to be beneficial to the optimized control system producing high eigenvalues at high values of Velocity/$\omega b$ .

In arranging a certain limited number of leading and trailing edge control pairs along the wing span as in FIG. 4, care must be taken to insure that solid chord sections of the wing do not exert an adverse effect upon flutter. Upward deflection of a trailing edge control in response to lift buildup causes a nose-up moment about the aerodynamic center (a.c.) which could affect the frequency of the wing so as to place the wing beyond the optimization frequency range. However, if the value of $C(1,2)$ is set so that regardless of trailing edge deflection upward, leading edge deflection downward rotates the chord to (effectively) a zero camber position as in FIG. 1d, there can be no moment about the a.c. and no detrimental effect upon wing frequency.

In suppressing flutter of a particular wing, the flutter equations are solved to obtain the flutter speed. Examination of wing deformation at this speed determines the most aerodynamically efficient location along the span for a pair of leading and trailing edge controls. This positioning depends upon the fourth power of the half chord ($b^4$) and the square of the response vector ( $q^2$ ). Since the fluttering wing generally responds most violently at its tip, this may be the control pair location for constant chord wings. For tapered wings the factor moves this location inboard. The flutter equations are again solved to obtain the flutter speed with one pair of leading and trailing edge controls. If the increase in flutter speed is insufficient, the above procedure is repeated by adding additional pairs of controls, one at a time, until the whole speed range is cleared. Generally speaking, a wing having n modes of vibration may require, at most, $n/2$ pairs of controls with care being exercised to insure that all possible mode shapes within the frequency band that activates the controls are considered.

In allowing the pilot to control the aircraft, a lower frequency limit can be set by using a "washout" filter which permits aircraft response to pilot-initiated control deflections. At the high frequency limit to avoid large phase lags with amplitude changes, integrations of accelerometer (sensor) signals and feedback error loop signals can be made to down-weight these signals at the higher frequencies.

The effect of control placement upon rigid body modes must be considered. FIG. 5 shows a leading and trailing edge control pair 12 and 11 mounted near the tip 21 of a highly swept wing 20 and therefore well aft of the vehicle center of gravity 16. When the control pair 12 and 11 reacts to combat lift buildup (for example) due to flutter the resultant downward force behind the center of gravity induces a destabilizing nose-up pitching moment affecting the vehicle. Such effects are combatted passively by the use of a washout filter and actively by placement of a leading and trailing edge control pair on the horizontal tail plane or canard surface, introducing a linear stiffness term through adjustment of the transfer function $C(2,1)$. By fitting control pairs to the horizontal and vertical tail flutter of the tail separable from those terms primarily influencing flutter, permitting separate treatment and optimization.

The problem of chordwise deformation due to twisting may be met by installing rotational accelerometers on the leading and trailing edge controls near their hinge lines as shown in FIG. 6a. Sensors 13 and 14 are mounted on a center chord section which is assumed rigid. Signals from sensors 13 and 14 are processed to give control deflections $\beta$ and $\delta$ as before and also to find $\alpha_e$, see FIG. 6b. Signals from the sensors 17 and 18 are processed to give the angle $\alpha 17$ and $\alpha 18$ which correspond to the control deflections caused by chordwise deformation. Knowing $\alpha 17$, $\alpha 18$ and $\alpha_e$, $B_e$ and $\delta_e$ can be found where the subscript $e$ denotes equivalent deformed chord deflection. The eror function of the feedback loop can now serve the dual purpose of subtracting out the equivalent control deflections and insuring control movement which results in attaining $\beta$ and $\delta$ as on a rigid chord section.

Although the invention has been described and illustrated in detail in a specified embodiment thereof, it is to be understood that this description is by way of illustration only and is not to be taken as limiting on the applicant's invention. Obviously, there are many modifications and variations of the present invention possible in the light of the above teachings. Any body moving through a fluid susceptible to oscillation or flutter or any protruding member is the proper subject of the invention. The sensors used to determine $\alpha$ and $h$ may be a combination of a rotation displacement and linear displacement sensor or a sensor of any time derivatives thereof or two linear displacement sensors or sensors of any linear displacement time derivatives although the preferred embodiment employs two linear plane can be suppressed and rigid body modes as well as gust response may be controlled as well. In fact, gust alleviation terms in equations (1) and (2) are generally accelerometers. Sensors location must be at a wing or empennage (or other surface) section where the control pair to be operated is placed and are located near but not on the control surfaces. Airfoil shape is immaterial to the invention. It is anticipated that for landing, some of the control pairs might be used as flaps for reducing stall speed. Some control pairs might be used for maneuvering while others serve only to suppress flutter or damp other oscillations. While hinged, flapped controls are used, deformable leading and trailing edge sections would also serve the purpose of the invention. The use of spoilers with the leading and trailing edge controls, while increasing drag might serve to overcome flutter problems in an unusual case. Hinged, slotted controls might also be used.

What is claimed as new and desired to be secured by Letters Patent of the U.S. is:

1. Apparatus for flutter suppression, gust alleviation and stability augmentation on a vehicle, having at least one lift-producing member, moving in a fluid comprising:

a first control member movably attached to the leading edge of said lift-producing member, a second control member movably attached to the trailing edge of said lift-producing member, sensor means attached to said lift-producing member for producing signals indicative of the motion of said lift-producing member caused by flutter, gusts and vehicle instability;

computer means, receiving said produced signals from said sensor means, for producing first and second signals indicative of the movement of said first and second control members, respectively, necessary to damp out said motion caused by flutter, gust and vehicle instability;

said computer means is a computer that receives the outputs from said sensor means and produces said first and second signals in accordance with the following two equations:

$$\beta = [C(1,1) + iG(1,1)] h/b + [C(1,2) + iG(1,2)] \alpha$$
$$\delta = [C(2,1) + iG(2,1)] h/b + [C(2,2) + iG(2,2)] \alpha$$

where $\beta$ is said first signal, $\delta$ is said second signal, h and $\alpha$ are indicative of the linear and angular components, respectively, of said motion caused by flutter, gusts and vehicle instability, $b$ is a constant proportional to the chord of said lift-producing member, $i$ represents a 90° phase lead, and $C(1,1)$, $C(1,2)$, $C(2,1)$, $C(2,2)$, $G(1,1)$, $G(1,2)$, $G(2,1)$ and $G(2,2)$ are predetermined transfer functions;

means receiving said first signal for moving said first control member proportional to said first signal; and means receiving said second signal for moving said second control member proportional to said second signal whereby the motion caused by flutter, gusts and vehicle instability is damped out.

2. The apparatus of claim 1 wherein the lift-producing member is an airfoil and said first and second control members are hinged leading edge and trailing edge flapped controls which are operated in concert to change the lift and pitching moment produced by said airfoil.

3. Apparatus according to claim 1 wherein said sensor means includes first and second accelerometers.

4. Apparatus according to claim 3 wherein said first and second accelerometers are linear accelerometers.

5. Apparatus according to claim 3 wherein said first accelerometer is a linear accelerometer and said second accelerometer is an angular accelerometer.

* * * * *

UNITED STATES PATENT OFFICE
CERTIFICATE OF CORRECTION

Patent No. 3,734,432　　　　　　　Dated May 22, 1973

Inventor(s) George M. Low

It is certified that error appears in the above-identified patent and that said Letters Patent are hereby corrected as shown below:

On the cover sheet "[76] Inventor: George M. Low, c/o National Aeronautics and Space Administration, Washington, D. C. 20546" should read -- [76] George M. Low, Acting Administrator of the National Aeronautics and Space Administration with respect to an invention to Eliahu Nissim, a citizen and resident of Israel --.

Signed and sealed this 20th day of August 1974.

(SEAL)
Attest:

McCOY M. GIBSON, JR.　　　　　　　　　C. MARSHALL DANN
Attesting Officer　　　　　　　　　　Commissioner of Patents